United States Patent
Khoudari et al.

(10) Patent No.: US 6,213,499 B1
(45) Date of Patent: Apr. 10, 2001

(54) SIDE AIR BAG SYSTEM

(75) Inventors: Bassam Georges Khoudari, Sterling Heights, MI (US); Ralph L. Elam, Germantown, OH (US); James Frederick Pywell, Shelby Township, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/363,063

(22) Filed: Jul. 29, 1999

Related U.S. Application Data

(60) Provisional application No. 60/095,206, filed on Aug. 3, 1998.

(51) Int. Cl.[7] .................................................. B60R 21/22
(52) U.S. Cl. ................................. 280/730.2; 280/730.1; 280/743.1; 280/729
(58) Field of Search .................. 280/730.2, 730.1, 280/743.1, 729

(56) References Cited

U.S. PATENT DOCUMENTS

| | | | |
|---|---|---|---|
| 3,642,303 | * 2/1972 | Irish et al. ....................... | 280/730.1 |
| 3,731,949 | 5/1973 | Radke . | |
| 3,768,830 | 10/1973 | Hass . | |
| 4,262,931 | 4/1981 | Strasser et al. . | |
| 4,290,627 | * 9/1981 | Cumming et al. .................. | 280/729 |
| 5,172,934 | * 12/1992 | Frantz et al. ..................... | 280/740 |
| 5,322,322 | 6/1994 | Bark et al. . | |
| 5,464,250 | * 11/1995 | Sato .................................. | 280/743.1 |
| 5,575,497 | * 11/1996 | Suyama et al. ................... | 280/730.1 |
| 5,586,782 | * 12/1996 | Zimmerman II et al. ........ | 280/730.2 |
| 5,697,641 | * 12/1997 | McGee et al. .................... | 280/743.1 |
| 5,718,450 | * 2/1998 | Hurford et al. ................... | 280/730.2 |
| 5,791,685 | * 8/1998 | Lachat et al. ..................... | 280/743.1 |
| 5,845,935 | * 12/1998 | Enders et al. ..................... | 280/743.2 |
| 5,853,191 | * 12/1998 | Lachat .............................. | 280/730.2 |
| 5,890,732 | * 4/1999 | Nakamura et al. ................ | 280/729 |
| 5,895,070 | * 4/1999 | Lachat .............................. | 280/730.2 |
| 5,899,490 | * 5/1999 | Wipasuramonton et al. .... | 280/730.2 |
| 6,042,141 | * 3/2000 | Welch et al. ..................... | 280/729 |
| 6,059,311 | * 5/2000 | Wipasuramonton et al. ..... | 280/729 |

* cited by examiner

*Primary Examiner*—Brian L. Johnson
*Assistant Examiner*—Deanna L. Draper
(74) *Attorney, Agent, or Firm*—Kathryn A. Marra

(57) ABSTRACT

A side air bag system for an automotive vehicle includes an inflator mounted to vehicle structure of the automotive vehicle and an air bag operatively connected to the inflator. The side air bag system includes an internal flap disposed within the air bag for inflation by the inflator and for retaining the inflation adjacent an occupant seated in the automotive vehicle.

20 Claims, 2 Drawing Sheets

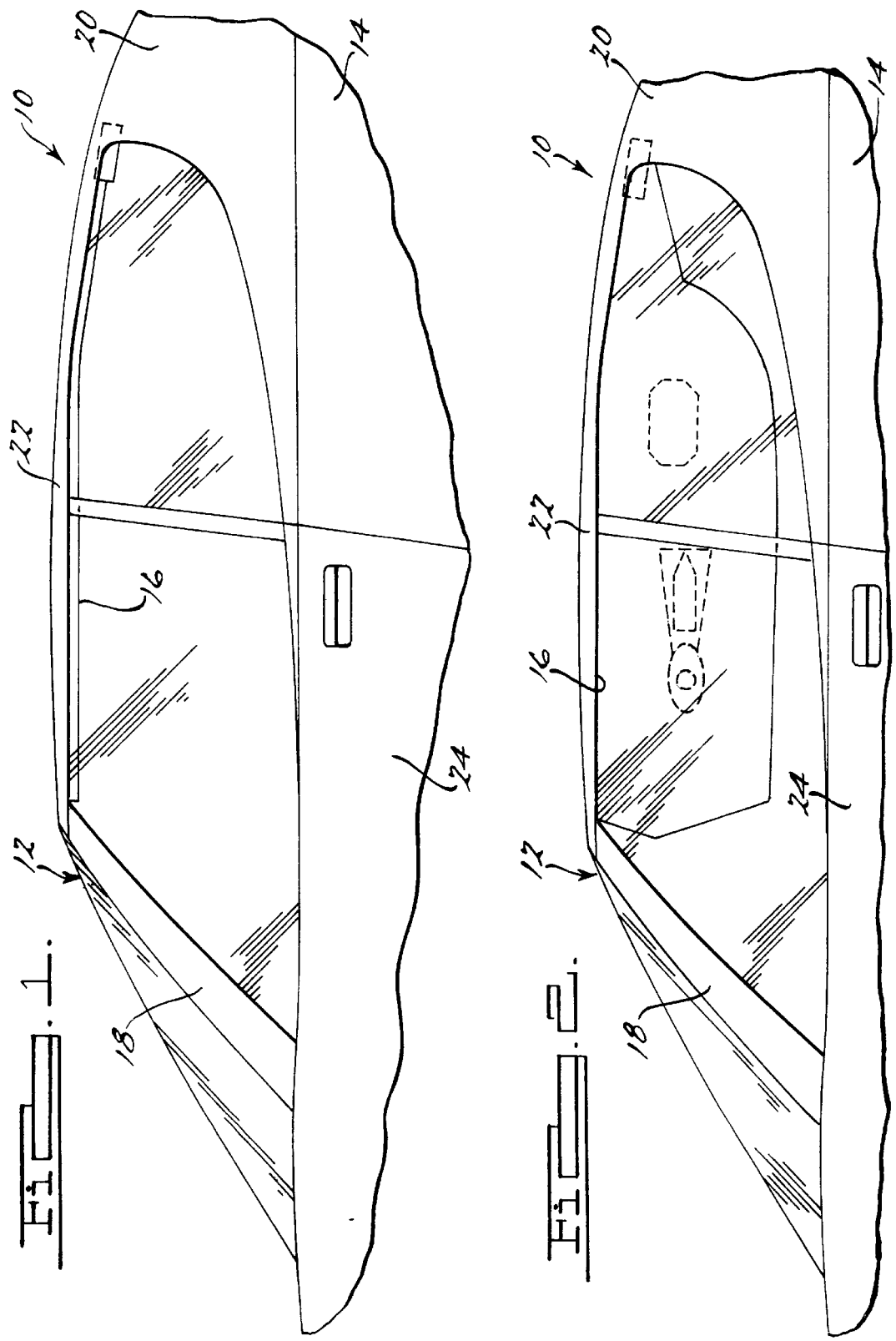

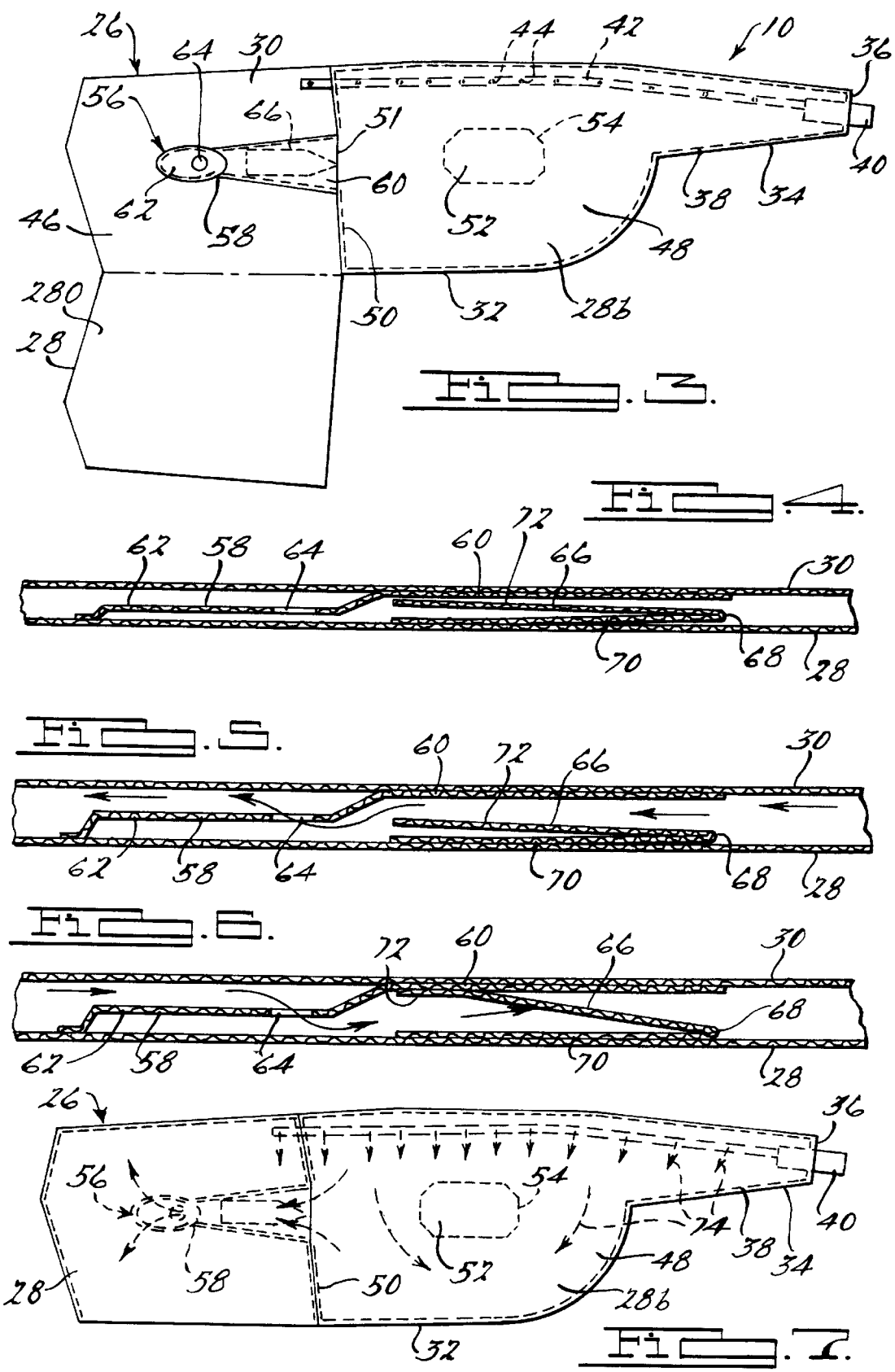

SIDE AIR BAG SYSTEM

CROSS-REFERENCE TO RELATED APPLICATION(S)

The present application claims priority from the provisional application, Ser. No. 60/095,206, filed Aug. 3, 1998.

TECHNICAL FIELD

The present invention relates generally to inflatable restraint systems for vehicles and, more particularly, to a side air bag system for an automotive vehicle.

BACKGROUND OF THE INVENTION

It is known to provide an inflatable restraint system in a vehicle such as an automotive vehicle to augment protection traditionally afforded vehicle occupants through the use of seat belts. In some automotive vehicles, the inflatable restraint system may be a side air bag system disposed within an occupant compartment in the automotive vehicle in close proximity to either a driver occupant or one or more passenger occupants. Typically, the side air bag system includes a side air bag module attached to a frame of a seat and having an air bag for deployment through an opening in the seat to extend in an occupant compartment of the automotive vehicle. The deployed air bag isolates the occupant from forcefully striking parts on the side of the automotive vehicle as a result of a collision.

It is known to provide an air bag system that provides initial inflated coverage and extended inflated coverage at predetermined locations of the automotive vehicle. An example of such an air bag system is disclosed in co-pending application, U.S. Ser. No. 08/918,833, filed August 1997. This air bag system included an inflator and an air bag cushion having an inflatable transfer portion in fluid communication with the inflator for initial inflation by the inflation gas. The air bag cushion included an inflatable bladder portion in fluid communication with the transfer portion for extended inflation by transfer of inflation gas from the transfer portion. The bladder portion engages the transfer portion to limit the amount of gas further transferred into the bladder portion and to seal the bladder portion such that inflation gas is held in the bladder portion for lengthened and extended inflation of the bladder portion event after deflation of the transfer portion for extended coverage of a pre-selected vehicle location.

Although the above side air bag system has worked well, it is desirable to provide a new side air bag system which removes the internal bladder and retains pressure for extended periods under certain conditions. It is also desirable to provide a side air bag system that is a curtain type head air bag and removes the internal bladder from the air bag to reduce relative complexity, cost and manufacturing operations. Therefore, there is a need in the art to provide an improved side air bag system for an automotive vehicle.

SUMMARY OF THE INVENTION

It is, therefore, one object of the present invention to provide a side air bag system for an automotive vehicle.

It is another object of the present invention to provide a side air bag system with a curtain type head air bag.

It is yet another object of the present invention to provide a side air bag system that can retain pressure for extended periods under certain conditions.

To achieve the foregoing objects, the present invention is a side air bag system for an automotive vehicle including an inflator mounted to vehicle structure of the automotive vehicle and an air bag operatively connected to the inflator. The side air bag system includes an internal flap disposed in the air bag for inflation of a portion of the air bag and for retaining the inflation adjacent an occupant seated in the automotive vehicle.

One advantage of the present invention is that an improved side air bag system is provided for an automotive vehicle. Another advantage of the present invention is that the side air bag system provides a curtain type air bag that retains pressure for extended periods under certain conditions. Yet another advantage of the present invention is that the side air bag system provides an air bag with a filler flap that inflates a portion of the air bag and retains the pressure therein. Still a further advantage of the present invention is that the side air bag system has a relatively low cost due to a reduction in material, labor and manufacturing. A further advantage of the present invention is that the side air bag system has a relatively ease of assembly due to less material, simpler design and less time to manufacture.

Other objects, features and advantages of the present invention will be readily appreciated, as the same becomes better understood after reading the subsequent description taken in conjunction with the accompanying drawings.

BRIEF DESCRIPTION OF THE DRAWINGS

FIG. 1 is a side view of a side air bag system, according to the present invention, illustrated in operational relationship with an automotive vehicle.

FIG. 2 is a view similar to FIG. 1 illustrating the side air bag system in a deployed position.

FIG. 3 is a plan view of the side air bag system of FIG. 1.

FIG. 4 is a sectional view of the side air bag system of FIG. 1.

FIG. 5 is a view similar to FIG. 4 illustrating gas entering an air bag via a filler flap of the side air bag system.

FIG. 6 is a view similar to FIG. 4 illustrating gas prevented from exiting the air bag via the filler flap of the side air bag system.

FIG. 7 is a view similar to FIG. 3 illustrating gas being expelled through a diffuser and into the air bag of the side air bag system of FIG. 1.

DESCRIPTION OF THE PREFERRED EMBODIMENT

Referring to the drawings and in particular FIG. 1, one embodiment of a side air bag system 10, according to the present invention, is shown for a vehicle (partially shown) such as an automotive vehicle, generally indicated at 12. The automotive vehicle 12 includes a vehicle body 14 forming an occupant compartment 16. The vehicle body 14 includes an A-pillar 18 and a C-pillar 20 spaced longitudinally and extending upwardly. The vehicle body 14 also includes a roof rail 22 interconnecting upper ends of the A-pillar 18 and C-pillar 20. The automotive vehicle 12 includes a seat (not shown) mounted by suitable means to vehicle structure (not shown) in the occupant compartment 16 of the automotive vehicle 12. The automotive vehicle 12 also includes a door 24 mounted by suitable means to the vehicle body 14 and disposed adjacent the seat. It should be appreciated that an occupant (not shown) is typically seated in the seat adjacent the door 24. It should also be appreciated that, except for the side air bag system 10, the automotive vehicle 12 is conventional and known in the art.

Referring to FIGS. 1 through 4, the side air bag system 10, according to the present invention, includes an air bag, generally indicated at 26, for deployment and inflation between the door 24 and the occupant. The air bag 26 includes a first or inboard panel 28 and a second or outboard panel 30. The inboard panel 28 may be split into a forward half 28a and a rear half 28b for a function to be described. The inboard panel 28 and outboard panel 30 have a main portion 32 which is generally rectangular in shape and a neck portion 34 extending longitudinally from the main portion 32 which is generally trapezoidal in shape. The neck portion 34 is of a size substantially smaller in width and length than the main portion 32 to form an inflator aperture 36 for a function to be described. The inboard panel 28 and outboard panel 30 are connected or attached together by stitching with a thread material 38 along the perimeter thereof. The inboard panel 28 and outboard panel 30 are made of a fabric material such as nylon or polyester as is known in the art.

The side air bag system 10 includes an inflator 40 operatively connected to and cooperating with the air bag 26 for inflating the air bag 26. The inflator 40 extends through the inflator aperture 36 and is at least partially disposed within the air bag 26. The inflator 40 extends longitudinally and is generally cylindrical in shape. The inflator 40 includes an inflator bracket (not shown) for mounting the inflator 40 to the C-pillar 20 by suitable means such as fasteners (not shown). It should be appreciated that the inflator 40 is activated by a source of power to expel a gas.

The inflator 40 may include a diffuser 42 at one axial end to diffuse the expelled gas into the air bag 26. The diffuser 42 is generally tubular in shape and extends longitudinally. The diffuser 42 has a plurality of apertures 44 spaced longitudinally therealong to allow the expelled gas to pass therethrough into the air bag 26. It should be appreciated that the output of the diffuser 42 may be tuned for the amount of gas entering into the air bag 26.

The air bag 26 is divided into a plurality of, preferably a pair of separate and distinct chambers to form a forward head cushion 46 and a rear head cushion 48. The forward head cushion 46 and rear head cushion 48 are formed by a generally vertical or lateral sew line 50 connecting the inboard panel 28 and the outboard 24, resulting in a pinch-off zone. The sew line 50 is discontinuous to form a fill opening 51 for the forward head cushion 46. The sew line 50 separates the front head cushion 46 and rear head cushion 48. The rear head cushion 48 may include at least one pinch-off zone 52 form by a sew line 54 connecting the inboard panel 28 and outboard panel 30 together. The pinch-off zone 52 is generally rectangular in shape and is not inflated. It should be appreciated that the pinch-off zone 52 can have any suitable shape.

The side air bag system 10 includes an internal filler flap, generally indicated at 56, for filling the forward head cushion 46 and for retaining the inflation of the forward head cushion 46. The filler flap 56 includes a first panel 58 extending longitudinally. The first panel 58 has a funnel shaped portion 60 connected to the outboard panel 30 across the fill opening 51 and an oval shaped portion 62 connected to the inboard panel 28. The oval shaped portion 62 has an aperture 64 extending therethrough to allow the gas to pass through the first panel 58. The filler flap 56 also includes a second panel 66 cooperating with the first panel 58. The second panel 66 extends longitudinally and has a generally pentagonal shape. The second panel 66 is folded upon itself at 68 to form a stationary portion 70 connected to the inboard panel 28 and a movable portion 72 that cooperates with the funnel shaped portion 50 of the first panel 58 and the stationary portion 70. It should be appreciated that the perimeter of the first panel 58 and the stationary portion 70 are stitched with the thread material 38 to the inboard panel 28 and outboard panel 30.

In operation, the side air bag system 10 is mounted in the roof rail 22 with the air bag 26 is in a folded stowed position. When the automotive vehicle experiences a collision-indicating condition of at least a predetermined threshold level, the inflator 40 is activated and a gas is expelled through the diffuser 42 and into the air bag 26 as indicated by the arrows 74 illustrated in FIG. 6. Gas enters and fills the rear head cushion 58 from the rear to the front. It should be appreciated that gas may also enter the forward head cushion 46 via the diffuser 42.

Referring to FIGS. 4 through 6, gas enters the forward head cushion 46 via the fill opening 51 and filler flap 56. As illustrated in FIG. 4, gas enters the fill opening 51 and moves the movable portion 72 of the second panel 66 toward the stationary portion 70. The gas passes through the space between the movable portion 72 and outboard panel 30 and between the first panel 58 and inboard panel 28 and through the aperture 64 into the forward head cushion 46. The gas fills the forward head cushion 46. The forward head cushion 46 and rear head cushion 48 are inflated to extend into the occupant compartment 16 of the automotive vehicle 12 between the occupant and the door 24. Once the forward head cushion 46 is inflated and extended, the gas moves back through the aperture 64 and forces the movable portion 72 of the second panel 66 against the first panel 58, preventing the gas from exiting via the fill opening 51. As a result, the gas is trapped in the forward head cushion 46 and is retained for inflation adjacent an occupant seated in the automotive vehicle 12.

Accordingly, the side air bag system 10 provides extended inflation characteristics. The side air bag system 10 provides an air bag 26 having a plurality of chambers to form a front head cushion 46 and a rear head cushion 48. The side air bag system 10 provides an internal filler flap 56 to inflate the front head cushion 46 and retain the inflation thereof without the use of an inflatable bladder.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A side air bag system for an automotive vehicle comprising:
   an inflator mounted to a vehicle structure of the automotive vehicle;
   an air bag operatively connected to said inflator and mounted to a roof rail of the automotive vehicle; and
   an internal flap disposed in said air bag for inflation of a portion of said air bag and for retaining the inflation adjacent an occupant seated in the automotive vehicle.

2. A side air bag system as set forth in claim 1 wherein said air bag comprises an inboard panel and an outboard panel and being connected together.

3. A side air bag system as set forth in claim 1 wherein said internal flap comprises a first panel having a stationary portion connected to said inboard panel and a movable portion disposed adjacent said stationary portion.

4. A side air bag system as set forth in claim 1 including a diffuser connected to said inflator and extending longitudinally with a plurality of apertures to allow the gas to pass from said inflator and into said air bag.

5. A side air bag system as set forth in claim 1 including a sew line extending laterally across said air bag to separate said air bag into a first chamber and said second chamber.

6. A side air bag system as set forth in claim 5 wherein said internal flap has an opening to allow gas to enter said second chamber.

7. A side air bag system for an automotive vehicle comprising:
an inflator mounted to a vehicle structure of the automotive vehicle;
an air bag operatively connected to said inflator;
an internal flap disposed in said air bag for inflation of a portion of said air bag and for retaining the inflation adjacent an occupant seated in the automotive vehicle;
wherein said air bag comprises an inboard panel and an outboard panel and being connected together; and
wherein said inboard panel and said outboard panel are stitched together to form a fill opening.

8. A side air bag system as set forth in claim 7 wherein said internal flap comprises a plurality of panels sewn into said air bag between said inboard panel and said outboard panel at said fill opening.

9. A side air bag system for an automotive vehicle comprising:
an inflator mounted to a vehicle structure of the automotive vehicle;
an air bag operatively connected to said inflator;
an internal flap disposed in said air bag for inflation of a portion of said air bag and for retaining the inflation adjacent an occupant seated in the automotive vehicle;
a side air bag system as set forth in claim 1 wherein said air bag comprises an inboard panel and an outboard panel and being connected together; and
wherein said inboard panel and said outboard panel have a main portion and a neck portion.

10. A side air bag system for an automotive vehicle comprising:
an inflator mounted to a vehicle structure of the automotive vehicle;
an air bag operatively connected to said inflator;
an internal flap disposed in said air bag for inflation of a portion of said air bag and for retaining the inflation adjacent an occupant seated in the automotive vehicle;
wherein said internal flap comprises a first panel having a stationary portion connected to said inboard panel and a movable portion disposed adjacent said stationary portion; and
wherein said internal flap comprises a second panel having a first end connected to said inboard panel and a second end connected to said outboard panel and cooperating with said movable portion of said first panel.

11. A side air bag system as set forth in claim 10 wherein said second panel has an aperture disposed between said first end and said second end to allow gas to pass therethrough.

12. A side air bag system for an automotive vehicle comprising:
an inflator mounted to a pillar of the automotive vehicle;
an air bag operatively connected to said inflator and mounted to a roof rail of the automotive vehicle; and
said air bag having an inboard panel and an outboard panel connected to each other and an internal flap disposed between said inboard panel and said outboard panel for inflation by said inflator and for retaining the inflation adjacent a head of an occupant seated in the automotive vehicle.

13. A side air bag system as set forth in claim 12 wherein said internal flap comprises a first panel having a stationary portion connected to said inboard panel and a movable portion disposed adjacent said stationary portion.

14. A side air bag system for an automotive vehicle comprising:
an inflator mounted to a pillar of the automotive vehicle;
an air bag operatively connected to said inflator;
said air bag having an inboard panel and an outboard panel connected to each other and an internal flap disposed between said inboard panel and said outboard panel for inflation by said inflator and for retaining the inflation adjacent a head of an occupant seated in the automotive vehicle; and
wherein said inboard panel and said outboard panel are stitched together laterally to form a first chamber and a second chamber and a fill opening to allow gas to enter said second chamber.

15. A side air bag system as set forth in claim 14 wherein said internal flap comprises a plurality of panels sewn into said air bag between said inboard panel and said outboard panel at said fill opening.

16. A side air bag system for an automotive vehicle comprising:
an inflator mounted to a pillar of the automotive vehicle;
an air bag operatively connected to said inflator;
said air bag having an inboard panel and an outboard panel connected to each other and an internal flap disposed between said inboard panel and said outboard panel for inflation by said inflator and for retaining the inflation adjacent a head of an occupant seated in the automotive vehicle; and
wherein said inboard panel and said outboard panel have a main portion and a neck portion.

17. A side air bag system for an automotive vehicle comprising:
an inflator mounted to a pillar of the automotive vehicle;
an air bag operatively connected to said inflator;
said air bag having an inboard panel and an outboard panel connected to each other and an internal flap disposed between said inboard panel and said outboard panel for inflation by said inflator and for retaining the inflation adjacent a head of an occupant seated in the automotive vehicle;
wherein said internal flap comprises a first panel having a stationary portion connected to said inboard panel and a movable portion disposed adjacent said stationary portion; and
wherein said internal flap comprises a second panel having a first end connected to said inboard panel and a second end connected to said outboard panel and cooperating with said movable portion of said first panel.

18. A side air bag system as set forth in claim 17 wherein said second panel has an aperture disposed between said first end and said second end to allow gas to pass therethrough.

19. A side air bag system as set forth in claim 18 including a diffuser connected to said inflator and extending longitudinally with a plurality of apertures to allow the gas to pass from said inflator and into said air bag.

20. A side air bag system for an automotive vehicle comprising:

an inflator mounted to a pillar of the automotive vehicle;

an air bag operatively connected to said inflator and mounted to a roof rail of the automotive vehicle; and said air bag having an inboard panel and an outboard panel to form a first chamber and a second chamber and a fill opening to allow gas from said inflator to enter said second chamber and an internal flap disposed between said inboard panel and said outboard panel adjacent said fill opening, said first chamber being inflated by the gas from said inflator and the gas entering said second chamber via said opening neck and internal flap for inflation of said second chamber and said internal flap retaining the inflation of said second chamber adjacent a head of an occupant seated in the automotive vehicle.

* * * * *